United States Patent
Stern

(10) Patent No.: US 6,693,994 B1
(45) Date of Patent: Feb. 17, 2004

(54) MASTER SYSTEM FOR ACCESSING MULTIPLE TELEPHONY MESSAGING SYSTEMS

(75) Inventor: Benjamin J. Stern, Morris Township, Morris County, NJ (US)

(73) Assignee: AT&T Corp., New York, NY (US)

( * ) Notice: Subject to any disclaimer, the term of this patent is extended or adjusted under 35 U.S.C. 154(b) by 480 days.

(21) Appl. No.: 09/661,740

(22) Filed: Sep. 14, 2000

Related U.S. Application Data

(60) Provisional application No. 60/161,523, filed on Oct. 26, 1999.

(51) Int. Cl.[7] ............................................. H04M 1/64
(52) U.S. Cl. ..................... 379/67.1; 379/70; 379/74; 379/76; 379/88.04; 379/88.17; 379/88.18; 379/88.22; 379/88.25
(58) Field of Search ........................... 379/67.1, 68, 70, 379/74, 76, 88.04, 88.13, 88.17, 88.18, 88.19, 88.22, 88.25; 455/412, 413, 414

(56) References Cited

U.S. PATENT DOCUMENTS

| | | | |
|---|---|---|---|
| 4,837,798 A | | 6/1989 | Cohen et al. |
| 5,450,488 A | | 9/1995 | Pugaczewski et al. |
| 5,623,537 A | | 4/1997 | Ensor et al. |
| 5,659,599 A | | 8/1997 | Arumainayagam et al. |
| 5,675,507 A | * | 10/1997 | Bobo, II ................. 364/514 R |
| 5,724,406 A | | 3/1998 | Juster |
| 5,742,905 A | * | 4/1998 | Pepe et al. .................. 455/461 |
| 5,937,047 A | | 8/1999 | Stabler |
| 5,991,365 A | | 11/1999 | Pizano et al. |
| 6,233,318 B1 | * | 5/2001 | Picard et al. ............ 379/88.17 |
| 6,459,774 B1 | * | 10/2002 | Ball et al. .................. 379/67.1 |

* cited by examiner

*Primary Examiner*—Allan Hoosain

(57) ABSTRACT

A "master" telephony message system (TMS) application has been developed to allow an individual to access multiple message services (such as voice mail, telephone-accessed email, unified messaging, etc.) in succession without the need to repeatedly hang up and dial into each different system. The "master" application includes a database record of each TMS dial-in number and proceeds to dial the first number in sequence. The user then accesses the messages in a conventional manner, while the master application "listens" for a prompt from the user to disconnect from the first TMS account and dial in to the next TMS included in the user record. The application proceeds in sequence through each TMS included in the user record until each message system has been accessed or the user chooses to exit the program.

11 Claims, 2 Drawing Sheets

| USER ID | PASSWORD | | |
|---|---|---|---|
| 38 | 40 | 42 | 44 |
| TMS 1 | CALL DIAL-IN SEQUENCE 1 | ACCESS DTMF SEQUENCE 1 | USER-SPECIFIED SYSTEM NAME |
| TMS 2 | CALL DIAL-IN SEQUENCE 2 | ACCESS DTMF SEQUENCE 2 | USER-SPECIFIED SYSTEM NAME |
| ⋮ | ⋮ | ⋮ | ⋮ |
| TMS N | CALL DIAL-IN SEQUENCE N | ACCESS DTMF SEQUENCE N | USER-SPECIFIED SYSTEM NAME |

MASTER SYSTEM FOR ACCESSING MULTIPLE TELEPHONY MESSAGING SYSTEMS

CROSS-REFERENCE TO RELATED APPLICATION

This application claims the priority of Provisional Application No. 60/161,523, filed Oct. 26, 1999.

TECHNICAL FIELD

The present invention relates to a "master" telephony messaging system and, more particularly, to a master telephony messaging system that allows a subscriber to access messages stored in different services in succession without interruption.

BACKGROUND OF THE INVENTION

Many people have multiple voice messaging systems (e.g., home, office, wireless, etc.). In a broader context, electronic messaging services including electronic mail (email), voice mail and digital fax are common in today's business and home environments. In addition, a trend towards universal or unified messaging continues to emerge, particularly in the business environment. In most conventional message storage systems, a subscriber is assigned a "mailbox" (i.e., a specific address location in a large memory) and incoming calls are routed to and stored in the subscriber's mailbox. The subscriber then retrieves the messages from his mailbox by dialing into the message system and entering access and message retrieval codes (e.g., DTMF tones on his telephone) in response to some sort of audible prompts from the system. However, when a user wants to access multiple messaging systems, such as, for example, his "work" voice mail, "home" voice mail, cell phone messages, email, etc., he/she must end a session (e.g., hang up) with one message system and then initiate a call into the next system. Furthermore, the user must remember multiple telephone numbers, identification numbers, passwords, and other possible sequences for accessing these multiple systems.

Thus, a need remains in the art for the capability of a user to access diverse message storage systems to which he subscribes without having to re-initiate separate telephone calls.

SUMMARY OF THE INVENTION

The need remaining in the prior art is addressed by the present invention, which relates to a "master" telephony messaging system and, more particularly, to a master telephony messaging system that allows a subscriber to access messages stored in different services in succession without interruption.

In accordance with the present invention, a master "telephony message system" (TMS) application is used to store dial-in sequences and access codes for a plurality of different messaging services associated with a subscriber. In operation, the subscriber dials in to the master TMS, which then verifies the subscriber's capability to use the master TMS. Once verified, the TMS application then enters that subscriber's record and dials out to the first messaging system in the subscriber's record. The subscriber remains in contact with the master TMS during the process and can perform the usual messaging functions (deleting messages, forwarding messages, skipping messages, etc.) once the master TMS has entered a particular system. After all messages have been retrieved in a first messaging system, the subscriber can signal master TMS application to dial out to the second messaging system on the subscriber's list and continue the process until each messaging system has been accessed.

In a preferred embodiment of the present invention, the master TMS application remains capable of interacting with the subscriber and, upon receiving a predetermined code from the subscriber, will exit any messaging system when requested and automatically dial and enter the next system on the subscriber's list, or end the complete message retrieval process if requested.

Other and further embodiments of the present invention will become apparent during the course of the following discussion and by reference to the accompanying drawings.

BRIEF DESCRIPTION OF THE DRAWINGS

Referring to the drawings.

DETAILED DESCRIPTION

Figures 1, 2:
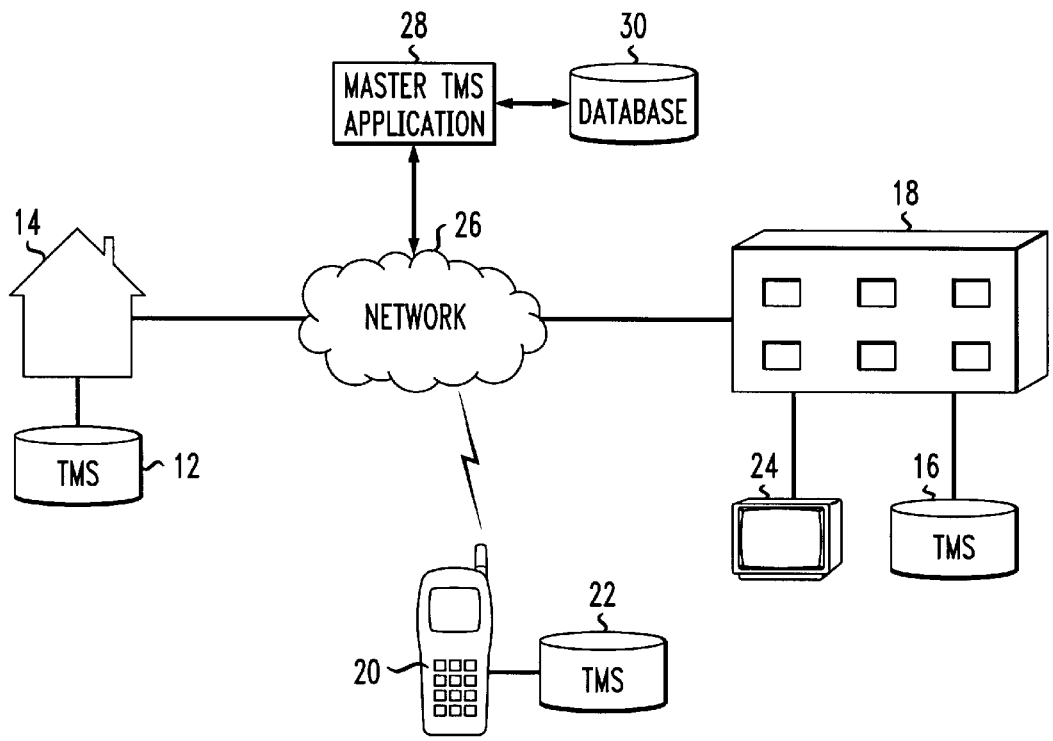
FIG. 1 illustrates an environment suitable for using the master TMS sequencing application of the present invention.
FIG. 2 is illustrative of a user record defining multiple messaging systems.

An exemplary environment 10 suitable for using the telephony messaging system (TMS) sequencing application of the present invention is illustrated in FIG. 1. In this example, a subscriber has a first TMS 12 (consisting of, for example, a unified messaging system) associated with his residence 14, a second TMS 16 (consisting of, for example, a voice mail system) associated with his business 18, a third TMS 22 (consisting of, for example, a voice mail system) associated with his wireless service 20, and a fourth TMS 24 (consisting of, for example, an email system) also associated with his business 18. Referring to FIG. 1, each of the locations are coupled into a common communications network 26, such as a conventional PSTN network. It is to be understood that this particular arrangement of message services associated with this subscriber is exemplary only, and any various combination of messaging services can be subscribed to and then accessed using the arrangement of the present invention. In the past, a subscriber would remotely access each message system by initiating separate telephone calls, then use pre-defined call sequences to access the separate messages stored in each mail system.

In accordance with the present invention, the need to separately access each TMS is avoided by using a "master" TMS application 28. Particularly, TMS application 28 is used to progress through each separate TMS in turn, allowing the subscriber to collect messages from all of his message systems in a single phone call and with a single access sequence. In general, and as will be explained in detail below, the subscriber initiates a single call into the master TMS application 28, where the application then takes over the process of accessing each system identified with the subscriber.

FIG. 2 illustrates an exemplary user record 30 that may be stored and used by TMS application 28. Each record 30 is accessed by a user/subscriber ID 32 and password field 34. Included in record 30 is a pointer 36 to each TMS 38 subscribed to by the user and the associated dial-in sequence 40, to be used by TMS application 28, to access each TMS 38. The access DTMF tones 42 used to step through the access sequence in a particular system 38 are also stored in record 30. This access sequence is transmitted to the selected TMS 38 after the system answers the call. This sequence may consist of one or more of the following: an identification number, a password, a command or commands to the system to enter a "play message" mode, or any other initialization sequence that the subscriber regularly enters at the beginning of a session with that particular messaging system. A user-specified name 44 for each system 38 may also be stored in record 30. This name can be spoken back to the user as the master TMS application 28 accesses the corresponding message system 38.

In accordance with the present invention, record 30 is programmable by the user to add/delete various telephony messaging systems as circumstances change. The dialing and accessing sequences of the messaging systems are also controlled by the user, since application 28 will simply step through each system 38 as it is listed in record 30. The stored user-specified name 44 can be used to easily identify each specific system 38 to the user during the sequence programming process.

Figure 3:
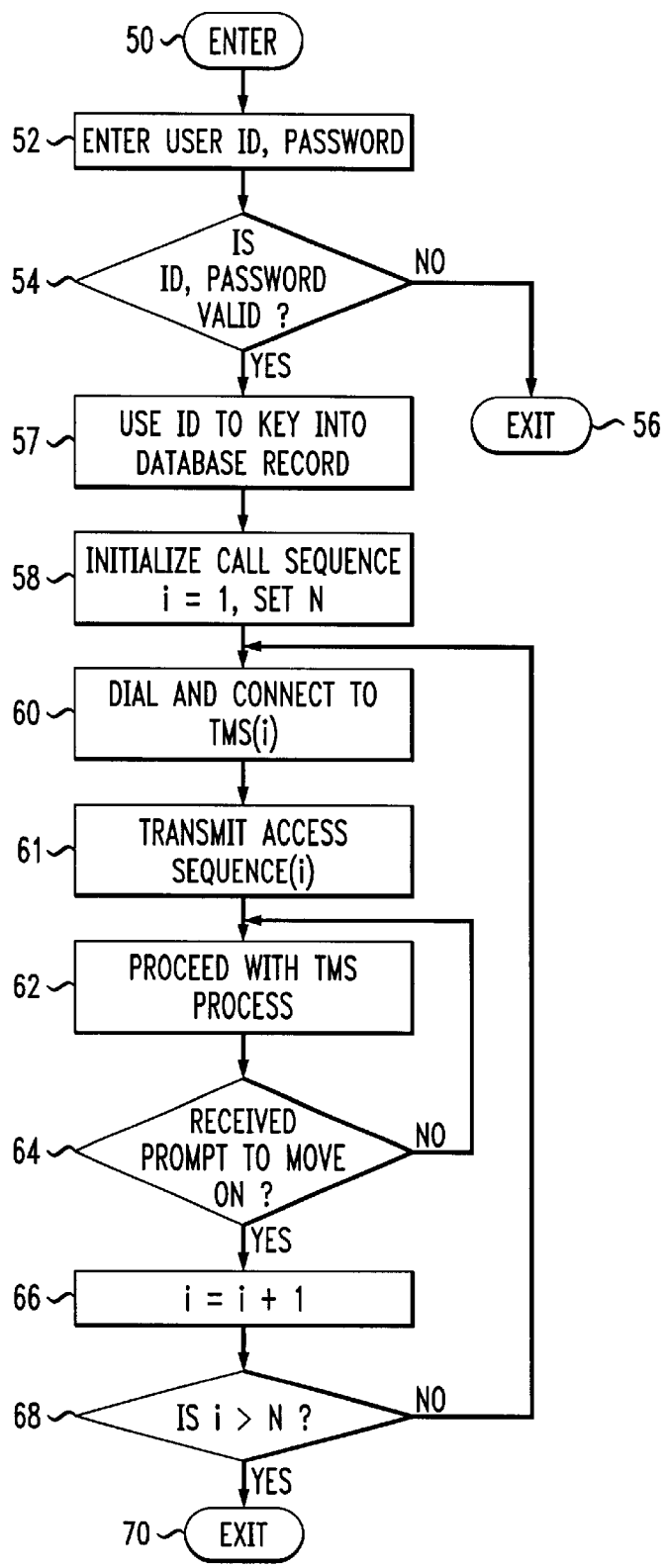
FIG. 3 contains a flowchart of an exemplary master TMS sequencing application of the present invention.

An illustrative flowchart of an exemplary TMS sequencing process, as used by application 28, is illustrated in FIG. 3. Initially, a user dials a predetermined number (or otherwise enters application 28 through a web page or any other suitable communication system) to reach TMS sequencing application 28 (block 50). The user is then prompted to enter his user ID and password (block 52), where both the ID and password may comprise a sequence of DTMF tones. The entered tones are then compared with those stored in fields 32 and 34 of record 30 (block 54) to validate the user's ability to enter the system. If the user ID and password do not match any stored in the TMS database, the program is exited (block 56). Otherwise, application 28 uses the user ID and password to identify the proper user record 30 (block 57) and proceeds to initialize the TMS call sequence (block 58). In particular, TMS application 28 begins by dialing the first call sequence 40 associated with the first TMS 38. Referring back to FIG. 1, the first TMS accessed may be the residential unified message system 14. Once application 28 has reached the first TMS system, the specific access DTMF tones for the user are retrieved from field 42 of record 30 and transmitted to the TMS (block 61) so that application 28 can access the messages stored in the user's mailbox. Subsequent to application 28 entering the user's mailbox in the first TMS, the user may interact with the first system in a usual fashion; that is, listening to messages, deleting and/or saving messages, forwarding messages, or using whatever options are included with the first system (block 62).

During the user's interaction with the first system, application 28 is "listening" for a prompt from the user (block 64), indicating that the user is ready to move on to the next TMS. The prompt may simply be the "#" key on a conventional telephone keypad, a sequence of keys, or a voice command from the user that application 28 is capable of recognizing using conventional automatic speech recognition techniques. Any suitable prompt may be used, as long as it does not interfere with a tone that would be interpreted by any of the systems as a progress tone for that particular system. Once this prompt is received, application 28 increments TMS pointer 36 (block 66) and checks to see if the last TMS system has been accessed (block 68). If there are more systems associated with the user, application 28 will return to block 60, dial the call-in number associated with the next system and proceed to access the user's mailbox associated with that system. For example and with reference to FIG. 1, the next TMS within the user's record may be voice mail system 20 of his wireless service 22. Again, application 28 will access record 30 to retrieve the dial-in sequence 40 for voice mail system 20. TMS application 28 will then retrieve the particular DTMF access tones 42 associated with the user's account in voice mail system 20 and then allow the user to again interact with this system. Once all of the systems have been accessed, application 28 will exit the program (block 70) or return to a "higher level" menu.

What has been described above is considered to be merely illustrative of the present invention. Other applications to telephone, computer or communicating device message systems other than the disclosed system are contemplated as being within the knowledge of one skilled in the art and may be utilized without departing from the spirit and scope of the present invention.

What is claimed is:

1. A message delivery system for accessing a plurality of separate message services associated with a subscriber, the system comprising a network master messaging processor including a database identifying authorized subscribers; and, for each authorized subscriber, a record including a listing of each message service within the subscriber's plurality of separate message services, said listing including a dial-in telephone number for accessing each message service and an access sequence for entering and initializing the subscriber's mailbox within each message service, the network master messaging processor responsive to a command from an authorized subscriber to enter a first mail box for a first separate message service in the listing by using the dial-in telephone number and access sequence for that message service, and further responsive to commands to progress through each message service in sequence through the listing.

2. The message delivery system as defined in claim 1 wherein the processor automatically progresses through each message service in an authorized subscriber's listing until each message service has been queried.

3. The message delivery system as defined in claim 1 wherein the processor waits for a prompt from an authorized subscriber to proceed through each message service in the authorized subscriber's listing.

4. The message delivery system as defined in claim 1 wherein at least one message service listing in an authorized subscriber's record includes a subscriber-specified name for that message service.

5. The message delivery system as defined in claim 4 wherein the subscriber-specified name is included in the listing as an audio recording of the name.

6. A method of establishing a master message service for allowing an authorized user to retrieve messages stored by a plurality of separate message services, the method comprising the steps of:

a) creating a master messaging application in a communication network, said application including for each authorized user a record including a listing of each message service subscribed to by said user, the record including a dial-in telephone number for accessing each separate message service, and an access sequence for entering the user's mailbox within each message service; and b) establishing a communication link between the master messaging application and each message service using the dial-in telephone numbers and access sequences.

7. The method as defined in claim 6 wherein the method further comprises the following steps to allow an authorized user to retrieve messages in sequence:

c) accessing, through a predetermined sequence, the master messaging application by a user;
   d) validating the user using authorization information stored in said master messaging application and exiting said application if the user is not authorized, otherwise;
   e) accessing the record of message service listings associated with the authorized user;
   f) initiating a telephone call to a first message service in said listing;
   g) accessing the authorized user's mailbox in the first message service;
   h) retrieving messages in said authorized user's mailbox; and
   i) repeating steps f)–h) until each message service has been accessed.

8. The method as defined in claim 7 wherein the method further comprises the step of:

j) after accessing a message service, responding to prompts entered by the authorized user to process various retrieved messages.

9. The method as defined in claim 8 wherein in performing step j), the processing includes deleting messages, forwarding messages, responding to messages.

10. The method as defined in claim 7 wherein the method further comprises the step of:

k) allowing the authorized user to enter a predetermined code to cause the application to move to the next message service before all messages have been retrieved from the current message service.

11. The method as defined in claim 7 wherein the method further comprises the step of:

l) allowing the authorized user to enter a predetermined code to exit the message retrieval process prior to accessing each message service and retrieving all the messages.

* * * * *